US009514098B1

(12) United States Patent
Subramanya et al.

(10) Patent No.: US 9,514,098 B1
(45) Date of Patent: Dec. 6, 2016

(54) ITERATIVELY LEARNING COREFERENCE EMBEDDINGS OF NOUN PHRASES USING FEATURE REPRESENTATIONS THAT INCLUDE DISTRIBUTED WORD REPRESENTATIONS OF THE NOUN PHRASES

(71) Applicant: Google Inc., Mountain View, CA (US)

(72) Inventors: Amarnag Subramanya, Sunnyvale, CA (US); Jingyi Liu, San Francisco, CA (US); Fernando Carlos das Neves Pereira, Palo Alto, CA (US); Kai Chen, Brisbane, CA (US); Jay Ponte, Mountain View, CA (US); Rami Al-Rfou', Stony Brook, NY (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 14/141,182

(22) Filed: Dec. 26, 2013

Related U.S. Application Data

(60) Provisional application No. 61/913,764, filed on Dec. 9, 2013.

(51) Int. Cl.
*G06F 17/21* (2006.01)

(52) U.S. Cl.
CPC .................................... *G06F 17/21* (2013.01)

(58) Field of Classification Search
CPC ....................................................... G06F 17/21
See application file for complete search history.

(56) References Cited

U.S. PATENT DOCUMENTS

| 5,712,956 A * | 1/1998 | Yamada ................ G10L 15/20 704/204 |
| 6,438,543 B1 | 8/2002 | Kazi et al. |
| 7,398,196 B1 * | 7/2008 | Liu .................... G06F 17/2745 704/1 |
| 7,672,833 B2 | 3/2010 | Blume et al. |

(Continued)

FOREIGN PATENT DOCUMENTS

CN          103177025 A  *  6/2013

OTHER PUBLICATIONS

Recasens, Marta; Hovy, Eduard; "A Deeper Look into Features for Coreference Resolution", Nov. 5-6, 2009, Anaphora Processing and Applications, 7th Discourse Anaphora and Anaphor Resolution Colloquium.*
Hearst, Marti A.; "TextTiling: Segmenting Text into Multi-paragraph Subtopic Passages", 1997, Association for Computational Linguistics; Computational Linguistics vol. 23, No. 1, pp. 33-64.*

(Continued)

*Primary Examiner* — Tammy Paige Goddard
*Assistant Examiner* — Walter Yehl
(74) *Attorney, Agent, or Firm* — Middleton Reutlinger

(57) ABSTRACT

Methods and apparatus related to determining coreference resolution using distributed word representations. Distributed word representations, indicative of syntactic and semantic features, may be identified for one or more noun phrases. For each of the one or more noun phrases, a referring feature representation and an antecedent feature representation may be determined, where the referring feature representation includes the distributed word representation, and the antecedent feature representation includes the distributed word representation augmented by one or more antecedent features. In some implementations the referring feature representation may be augmented by one or more referring features. Coreference embeddings of the referring and antecedent feature representations of the one or more noun phrases may be learned. Distance measures between two noun phrases may be determined based on the coreference embeddings.

18 Claims, 11 Drawing Sheets

(56) References Cited

U.S. PATENT DOCUMENTS

| | | | |
|---|---|---|---|
| 7,702,631 B1 | 4/2010 | Basu et al. | |
| 7,778,817 B1* | 8/2010 | Liu | G06F 17/21 704/9 |
| 7,813,916 B2 | 10/2010 | Bean | |
| 8,452,795 B1* | 5/2013 | Finkelstein | G06F 17/30392 707/713 |
| 8,457,950 B1* | 6/2013 | Gardner | G10L 15/1815 704/10 |
| 8,620,961 B2* | 12/2013 | Ittycheriah | G10L 15/1822 707/797 |
| 8,712,758 B2 | 4/2014 | Crouch et al. | |
| 8,731,901 B2 | 5/2014 | Srihari et al. | |
| 9,251,141 B1* | 2/2016 | Gubin | G06F 17/28 |
| 2002/0059161 A1* | 5/2002 | Li | G06F 17/30622 |
| 2005/0267871 A1* | 12/2005 | Marchisio | G06F 17/30672 |
| 2008/0243888 A1* | 10/2008 | Ittycheriah | G10L 15/1822 |
| 2009/0144609 A1* | 6/2009 | Liang | G06F 17/21 715/230 |
| 2009/0228439 A1* | 9/2009 | Manolescu | G06F 17/30864 |
| 2009/0326919 A1* | 12/2009 | Bean | G06F 17/2775 704/9 |
| 2011/0106807 A1* | 5/2011 | Srihari | G06F 17/30604 707/739 |
| 2012/0150532 A1 | 6/2012 | Mirowski et al. | |

OTHER PUBLICATIONS

Recasens, M., and E. Hovy. "BLANC: Implementing the Rand Index for Coreference Evaluation." Natural Language Engineering 1.1: 000-000, (Oct. 22, 2010), 26 pages.

Lee, Heeyoung, et al. "Deterministic Coreference Resolution Based on Entity-Centric, Precision-Ranked Rules." Computational Linguistics 39.4 (2013): 885-916, 32 pages.

Stanford Deterministic Coreference Resolution System, "The Stanford NPL (Natural Language Processing) Group," www.nlp.stanford.edu/downloads/dcoref.shtml, 4 pages.

Lee, Heeyoung, et al. "Stanford's Multi-Pass Sieve Coreference Resolution System at the CoNLL-2011 Shared Task," http://surdeanu.info/mihai/papers/conll2011st.pdf, 2011, 7 pages.

Raghunathan, Karthik, et al. "A Multi-Pass Sieve for Coreference Resolution." Proceedings of the 2010 Conference on Empirical Methods in Natural Language Processing. Association for Computational Linguistics, 2010, 10 pages.

Recasens, Marta, Marie-Catherine de Marneffe, and Christopher Potts. "The Life and Death of Discourse Entities: Identifying Singleton Mentions," http://nlp.stanford.edu/pubs/discourse-referent-lifespans.pdf, 2013, 7 pages.

Semantics and Pragmantics 1, Assignment 9, Fall 2011, http://semantics.uchicago.edu/kennedy/classes/f11/sp1/assignments/A9f11.pdf, 3 pages.

* cited by examiner

Barack Obama hosted a White House ceremony to commemorate Marie Curie's discovery of radium. Notable invitees were Michael Jordan, a seven-time NBA MVP, and Tiger Woods, this year's PGA Player of the Year. The President recalled Madame Curie's extraordinary contributions to Science, and he praised her for her two Nobel Prizes. Later, talking to the press corps, both Jordan and Woods spoke about the challenges they faced in repeating championship performances.

FIG. 2

John Duh, the founder of Duh.com, told reporters today that his reported purchase of the Baseball Team was a "gigantic mix-up," explaining that he had clicked on the Team by mistake.

"Duh! I guess I was just kind of browsing through their website and not paying close attention to what I was doing," he said. "No way did I intend to buy anything."

Mr. Duh said he had been oblivious to his online shopping error, clearly facilitated by his website, until earlier today, when he saw an unusual charge for two hundred and fifty million dollars on his American Express Card statement.

For now, Mr. Duh appears rather bearish on Duh Bears.

FIG. 4

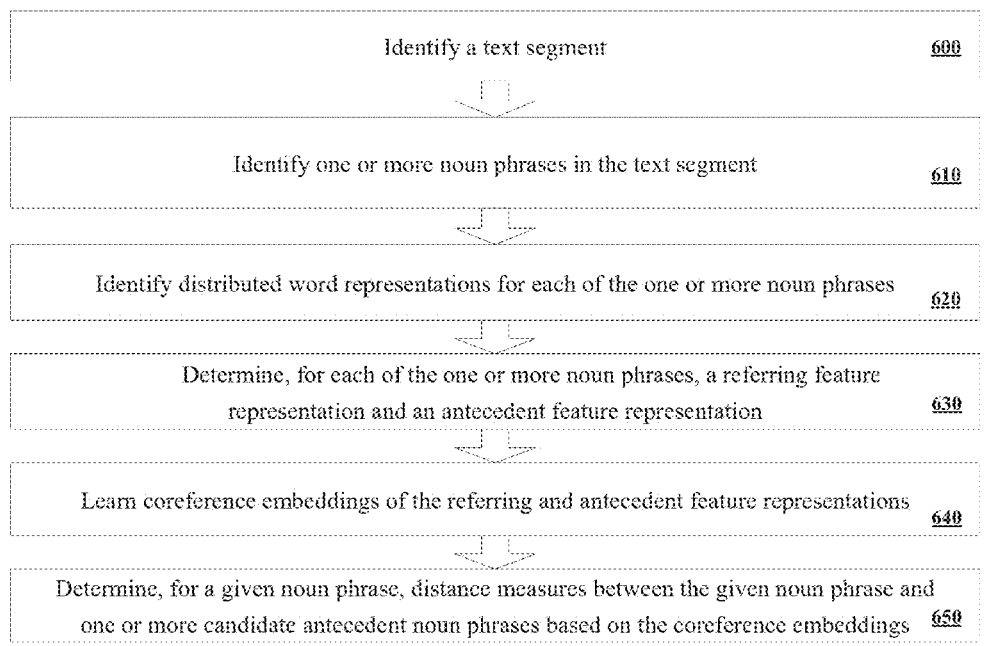

| Group | Symbol | Coreferential Noun Phrases |
|---|---|---|
| Group 1 (G₁) | ● | "John Duh", "founder", "his", "he" |
| Group 2 (G₂) | ◐ | "Duh.com" |
| Group 3 (G₃) | ★ | "reporters" |
| Group 4 (G₄) | ✹ | "Baseball Team", "Team" |

FIG. 5K

- Identify a text segment — 600
- Identify one or more noun phrases in the text segment — 610
- Identify distributed word representations for each of the one or more noun phrases — 620
- Determine, for each of the one or more noun phrases, a referring feature representation and an antecedent feature representation — 630
- Learn coreference embeddings of the referring and antecedent feature representations — 640
- Determine, for a given noun phrase, distance measures between the given noun phrase and one or more candidate antecedent noun phrases based on the coreference embeddings — 650

FIG. 6

ITERATIVELY LEARNING COREFERENCE EMBEDDINGS OF NOUN PHRASES USING FEATURE REPRESENTATIONS THAT INCLUDE DISTRIBUTED WORD REPRESENTATIONS OF THE NOUN PHRASES

CROSS-REFERENCE TO RELATED DOCUMENTS

This Application claims the benefit of Provisional Application Ser. No. 61/913,764, filed Dec. 9, 2013, which is hereby incorporated by reference in its entirety.

BACKGROUND

Coreference resolution is generally related to determining which noun phrases occurring in a text segment refer to the same underlying entity or concept.

SUMMARY

The present disclosure is generally directed to methods and apparatus to determining coreference resolution using distributed word representations. Distributed word representations, indicative of syntactic and semantic features, may be identified for one or more noun phrases. For each of the one or more noun phrases, a referring feature representation and an antecedent feature representation may be determined. The referring feature representation for a given noun phrase includes the distributed word representation for the given noun phrase. In some implementations the referring feature representation may be augmented by one or more referring features. The antecedent feature representation for the given noun phrase includes the distributed word representation for the given noun phrase augmented by one or more antecedent features. Coreference embeddings of the referring and antecedent feature representations of the one or more noun phrases may be learned. For the given noun phrase, distance measures between the given noun phrase and the one or more candidate antecedent noun phrases may be determined based on the coreference embeddings.

Some implementations are directed to identifying a language for a document, and determining coreference resolution for one or more noun phrases in the document in the identified language. Some implementations are directed to identifying a sequence of queries, and determining coreference resolution for one or more noun phrases in the sequence of queries.

In some implementations a computer implemented method may be provided that includes the steps of: identifying distributed word representations for one or more noun phrases, where the distributed word representations may be indicative of syntactic and semantic features of the one or more noun phrases; determining, for each of the one or more noun phrases, a referring feature representation and an antecedent feature representation, where the referring feature representation for a given noun phrase of the one or more noun phrases may include the distributed word representation for the given noun phrase, and the antecedent feature representation for the given noun phrase may include the distributed word representation for the given noun phrase augmented by one or more antecedent features, where the one or more antecedent features are indicative of semantic features of the given noun phrase as a candidate antecedent noun phrase; learning coreference embeddings of the referring and antecedent feature representations of the one or more noun phrases; and determining, for the given noun phrase, distance measures between the given noun phrase and one or more candidate antecedent noun phrases based on the coreference embeddings.

This method and other implementations of technology disclosed herein may each optionally include one or more of the following features.

In some implementations the method may further include: identifying a text segment from which the given noun phrase was identified; identifying a parse tree for the text segment; identifying, for the given noun phrase, a referring noun phrase of the one or more noun phrases; determining a path distance between the referring noun phrase and the given noun phrase in the parse tree; and determining one of the one or more antecedent features for the given noun phrase based on the path distance.

In some implementations the one or more antecedent features may be indicative of one or more of a type of entity, a type of mention, number of words in the noun phrase, and a gender associated with the noun phrase.

In some implementations the referring feature representation may be augmented with at least one referring feature, where the at least one referring feature is indicative of semantic features of the given noun phrase as a referring noun phrase. In some implementations the referring feature may be indicative of one or more of a type of entity, a type of mention, number of words in the noun phrase, and a gender associated with the noun phrase.

In some implementations the antecedent feature representation for the given noun phrase may include the referring feature representation for the given noun phrase augmented by the one or more antecedent features.

In some implementations the method may further include: ranking, for the given noun phrase, the one or more candidate antecedent noun phrases, where the ranking may be based on the determined distance measures; selecting an antecedent noun phrase of the one or more candidate antecedent noun phrases based on the ranking; and associating the selected antecedent noun phrase as the antecedent for the given noun phrase.

In some implementations identifying the distributed word representations for each of one or more noun phrases may further include identifying a language for the one or more noun phrases, and determining the distributed word representations based on the language.

In some implementations learning the coreference embeddings may be based on optimizing a loss function, where the loss function may be indicative of a number of incorrect candidate antecedent noun phrases for the given noun phrase.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein may utilize determined distance measures to determine coreference resolutions of one or more noun phrases in a document. Particular implementations of the subject matter described herein may identify a language and utilize coreference embeddings and distance measures to determine coreference resolutions of one or more noun phrases in a document in the identified language. Learned coreference embeddings of referring and antecedent feature representations of one or more noun phrases and determined distance measures present a new aspect of the one or more noun phrases. The determined coreference resolutions of the one or more noun phrases also present a new aspect of the document.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 is an example text segment illustrating referential and antecedent noun phrases.

FIG. 4 is an example text segment for which coreference resolution may be determined.

FIGS. 5A-5K illustrate an example method to group noun phrases.

FIG. 6 is a flow chart illustrating an example method of determining coreference resolution using distributed word representations.

DETAILED DESCRIPTION

Technology described herein is useful in determining coreference resolution using distributed word representations. Coreference resolution may be achieved by identifying noun phrases that occur in a text segment, and grouping together those noun phrases that refer to the same entity. For example, in a given document, "Barack Obama" may be referred to as "Mr. Obama", "Mr. President", and "he". The document may include additional noun phrases such as "Mr. Boehner", "the Speaker", "Mr. He", and "diplomat". The document may also include the sentence: "He addressed the gathered journalists at the White House." Determining if "He" refers to the candidate antecedent noun phrase "Barack Obama", "Mr. Boehner", or "Mr. He" is part of the coreference resolution problem. The methods and apparatus disclosed herein may rank the candidate antecedent noun phrases associated with "He", select the highest ranked candidate antecedent noun phrase, and associate "He" with the selected antecedent noun phrase.

Coreference resolution is generally related to determining which noun phrases occurring in a text segment refer to the same underlying entity. An entity, as used herein, may be a person, location, organization, title, concept, and so forth. A text segment may be, for example, all of the text in a document, part of the text in a document, a textual transcript of a document, an identified corpus of documents, and/or all or parts of the text in a collection of documents. A document may include a web page, a post on a social networking platform, an email communication, a text document, and/or multimedia content. In some implementations a text segment may include content of one or more queries issued by a user (e.g., search query, navigational query, and locational directional query).

Figure 1:
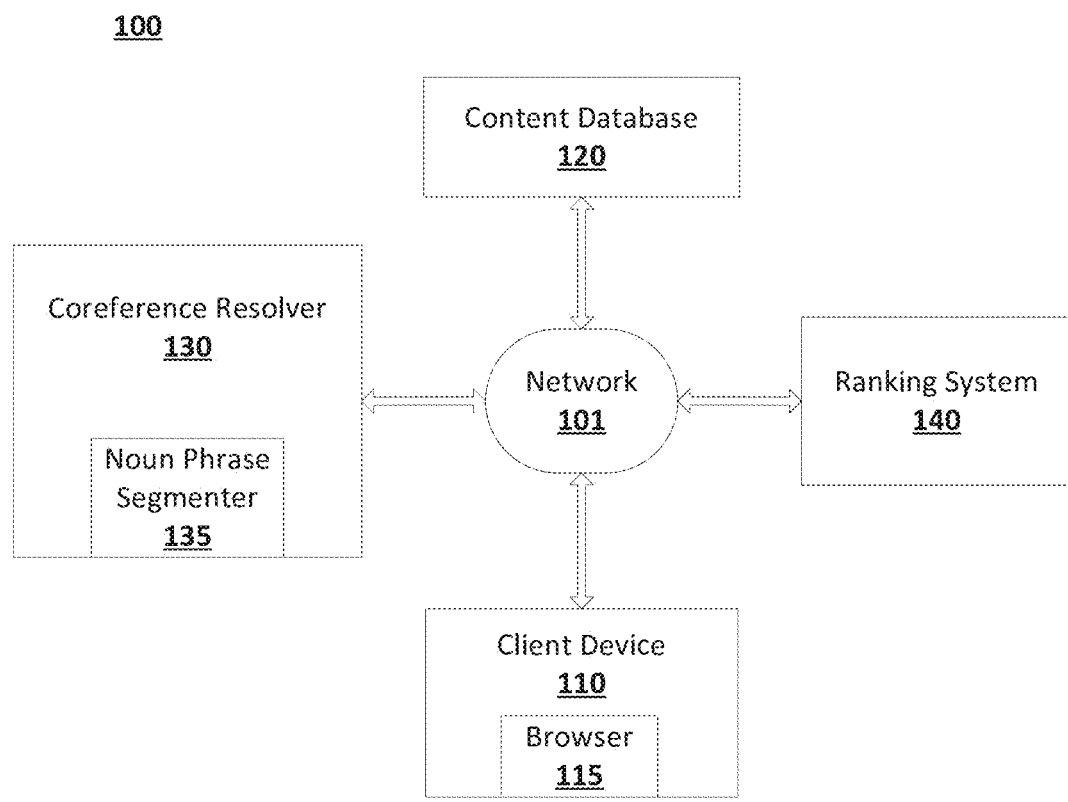
FIG. 1 is a block diagram of an example environment in which coreference resolution may be determined using distributed word representations.

FIG. 1 illustrates a block diagram of an example environment 100 in which a coreference resolution may be determined using distributed word representations. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 may also include a client device 110, a content database 120, a coreference resolver 130, a noun phrase segmenter 135, and a ranking system 140.

Many other configurations are possible having more or fewer components than the environment shown in FIG. 1. In some implementations the coreference resolver 130 may include the noun phrase segmenter 135 and/or the ranking system 140. In some implementations the coreference resolver 130, the noun phrase segmenter 135, and/or the ranking system 140 may be separate components of the environment.

The client device 110 may execute one or more applications, such as a web browser 115. The client device 110 may be, for example, a desktop computer, a laptop, a mobile phone, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices of the user may be provided.

A noun phrase is a phrase that has a noun (e.g., a name) and/or indefinite pronoun (e.g., she, it, they) as its head token. The head token of a noun phrase determines its syntactic type. For example, in the phrase "dining room" the head token is "room", thereby defining "dining room" as a noun phrase, instead of a verb phrase or an adjective phrase. As another example, in the phrase "student group" the head token is "student", thereby defining "student group" as a noun phrase, instead of a verb phrase or an adjective phrase. Also, for example, in the phrase "PGA Player of the Year" the head token is "Player".

Noun phrases may be of one or more mention types including named, nominal, or pronominal. For example, "Barack Obama", "Michael Jordan", "Marie Curie", and "Tiger Woods" are named noun phrases. As another example, "President", "NBA MVP", "Professor", and "PGA Player of the Year" are nominal noun phrases. Also, for example, "he", "his", "her", and "him" are pronominal noun phrases.

One or more noun phrases in a given text segment may be co-referential. Co-referential noun phrases refer to the same entity. For example, in a given text segment, "Barack Obama" may be referred to as "Mr. Obama", "Mr. President", and "he". As another example, the nominal noun phrase "NBA MVP", and the pronominal noun phrase "his" may both refer to the named noun phrase "Michael Jordan". Also, for example, the nominal noun phrase "Professor", and the pronominal noun phrase "her" may both refer to the named noun phrase "Marie Curie". Also, for example, the nominal noun phrase "PGA Player of the Year", and the pronominal noun phrase "him" may both refer to the named noun phrase "Tiger Woods".

A noun phrase may be a referring noun phrase and/or an antecedent noun phrase. An antecedent noun phrase is a noun phrase that precedes a given noun phrase in a text segment, and the given noun phrase refers to the antecedent noun phrase. The given noun phrase is also called a referring noun phrase.

Referring to FIG. 2, an example text segment is illustrated. For illustrative purposes, some noun phrases appearing in the text are underlined. The noun phrases "President", and "he" are referring noun phrases that refer to the antecedent noun phrase "Barack Obama". The noun phrases "NBA MVP", "Jordan", and "they" are referring noun phrases that refer to the antecedent noun phrase "Michael Jordan". The noun phrases "PGA Tour Player of the Year", "Woods", and "they" are referring noun phrases that refer to the antecedent noun phrase "Tiger Woods". Finally, the noun phrases "Madame Curie", "her", and "her" are referring noun phrases that refer to the antecedent noun phrase "Marie Curie".

In some implementations a noun phrase may be an antecedent noun phrase, but not a referring noun phrase. For example, with reference to FIG. 2, each of the noun phrases "Barack Obama", "Michael Jordan", "Tiger Woods", and "Marie Curie" is an antecedent noun phrase, but not a referring noun phrase. Also, for example, a noun phrase that introduces an entity for the first time in a text segment cannot be a referring noun phrase. In some implementations a noun phrase may perform a dual role in a text segment, i.e., the noun phrase may be a referring noun phrase and an antecedent noun phrase. For example, with reference to FIG. 2, each of the noun phrases "President", "Jordan", "Woods", and "Madame Curie" is a referring noun phrase that refers to the antecedent noun phrases "Barack Obama", "Michael Jordan", "Tiger Woods", and "Marie Curie", respectively. However, each of the noun phrases "President", "Jordan", "Woods", and "Madame Curie" is also an antecedent noun phrase for "he", "they", "her", and "they", respectively.

Figure 3:
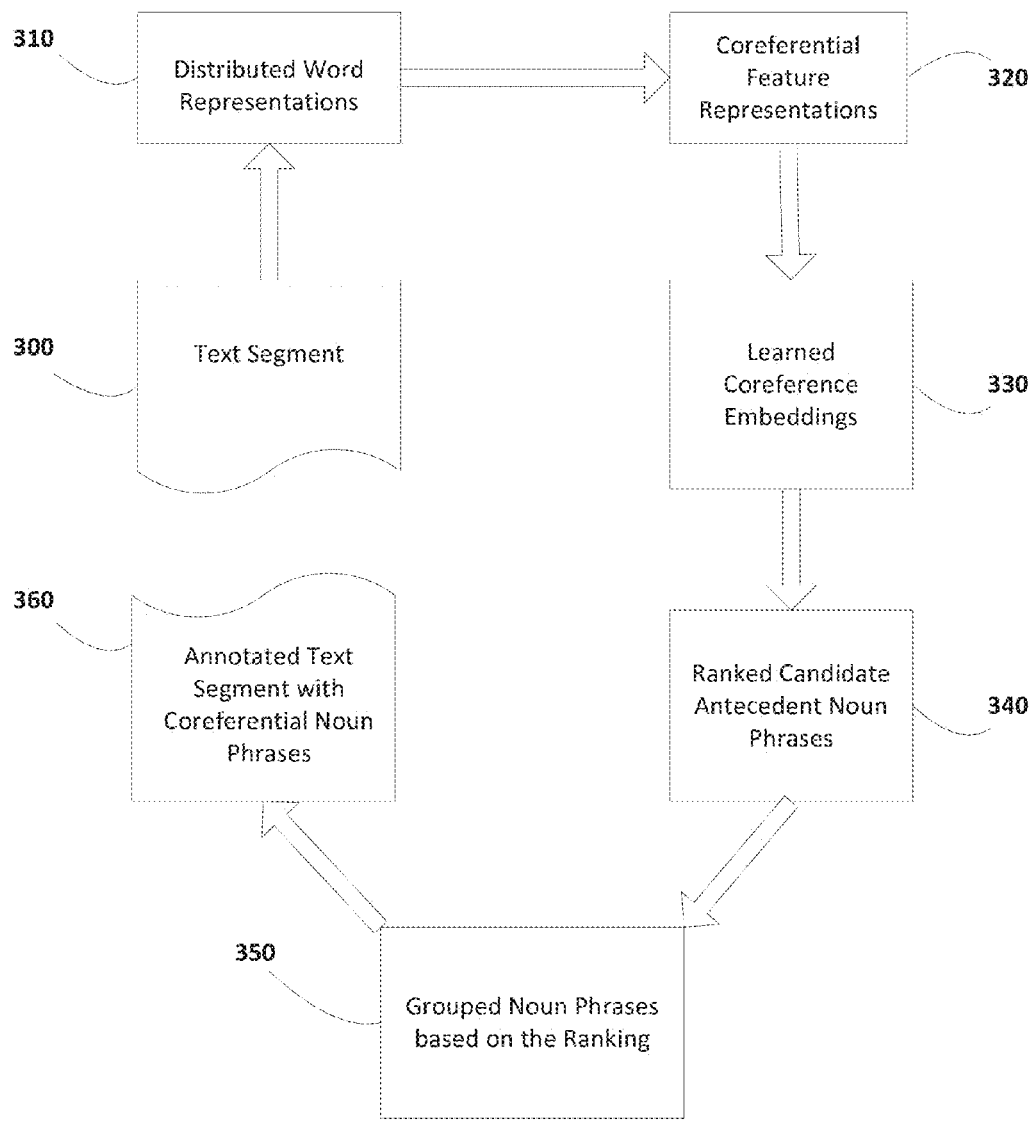
FIG. 3 illustrates a block diagram of an overview of an example of determining coreference resolution using distributed word representations.

Referring to FIG. 3, a block diagram illustrates an overview of an example of determining coreference resolution using distributed word representations. Each block in the block diagram represents data that may be identified, and/or generated, in determining coreference resolution using distributed word representations. Additional detail related to one or more steps of FIG. 3 is provided herein. For convenience, aspects of FIG. 3 will be described with reference to a system of one or more computers that may identify and/or generate the data represented by the blocks in FIG. 3. The system may include, for example, the coreference resolver 130, the noun phrase segmenter 135, and/or the ranking system 140 of FIG. 1.

In some implementations the noun phrase segmenter 135 may identify a text segment 300. One or more noun phrases may be identified in the text segment 300. In some implementations distributed word representations 310 may be identified for the one or more noun phrases. In some implementations a language processor may optionally process the text segment 300 to identify a language (e.g., English, Spanish). In some implementations, the text segment may include labeled and unlabeled data, and the language processor may identify labeled data that may be specific to the identified language (e.g., labeled data may include training co-referencing data for the language). The distributed word representations 310 may be determined for the unlabeled data in the text segment. In some implementations the text segment 300 may be parsed (e.g., into a parse tree) and co-referential feature representations 320 of the one or more noun phrases may be extracted. The coreference resolver 130 may utilize the labeled data as a training set to determine learned coreference embeddings 330 of the one or more noun phrases based on the co-referential feature representations 320. In some implementations such learned coreference embeddings 330 may be based on optimizing a loss function relevant to coreference resolution. The learned coreference embeddings 330 may determine a distance in an appropriate Euclidean space (e.g., based on an inner product). For a given noun phrase, the ranking system 150 may determine ranked candidate antecedent noun phrases 340 for one or more candidate antecedents of a given noun phrase. The coreference resolver 130 may determine grouped noun phrases 350 based on the ranked candidate antecedent noun phrases 340. In some implementations the coreference resolver 130 may annotate the text segment 300 with co-referential indicators based on the grouped noun phrases 350, to determine an annotated text segment with co-referential noun phrases 360.

In some implementations the content database 120 may include labeled and unlabeled data associated with one or more languages. In some implementations the content database 120 may include data related to words in a language, and distributed word representations associated with such words. Text segments including labeled data, parse trees, and referring features and/or antecedent features of one or more noun phrases may also be stored in the content database 120. In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently.

Distributed Word Representations

One or more noun phrases may be identified and the noun phrase segmenter 135 may identify distributed word representations for the one or more noun phrases. The distributed word representations are indicative of syntactic and semantic features of the one or more noun phrases. Syntactic features include syntactic configurations and constraints that may influence coreference relations among noun phrases. For example, syntactic features may include grammatical gender agreement.

Semantic features may include domain features, such as semantic agreement between selectional restrictions on a pronominal predicate argument and a semantic type of the antecedent. In some implementations such features may depend on one or more semantic resources, such as type information in a knowledge base linked to potential antecedents, or unsupervised distributional models that may measure semantic compatibility between two noun phrases. For example, the mention type of a noun phrase may be based on a mapping of the noun phrase to the mention type in a knowledge base.

Contextually similar noun phrases may have distributed word representations that are proximate to each other in an embedded space. For example, the noun phrases "Planet", "Galaxy", "constellation", and "Cassiopeia" may be identified to have distributed word representations that are proximate to the noun phrase "Andromeda" based on contextual analysis of a text segment that describes astronomical objects; whereas the noun phrases "Helen", "Troy", "Greece", "mythology", and "Perseus", may be identified to have distributed word representations that are proximate to the noun phrase "Andromeda" based on contextual analysis of a text segment that describes Greek mythology.

In some implementations the coreference resolver 130 may access the content database 120 to retrieve stored distributed word representations for the one or more noun phrases in the text segment. For example, distributed word representations may be determined using one or more models, and the distributed word representations and associated models may be stored in the content database 120. In some implementations the one or more models may include, for example, a feed-forward neural network language model. In this model, a next-word probability of a word $W_t$ may be computed from a context of previous n words $W_{t-n}, \ldots W_{t-1}$. The model may consist of one or more layers, including a projection layer where each context word may be projected to an embedding vector. Such embedding vectors may, in turn, be concatenated to form an input to a hidden layer of the one or more layers. The model may also include an output layer that may represent a probability distribution of $W_t$ based on contextual analysis. The feed-forward neural network language model may include several variables, including the number of embedding vector dimensions, the size of a vocabulary, number of hidden layers, number of neurons in each layer of the one or more layers, and so forth. Additional and/or alternate variables may be utilized, including an error used in a loss function, a learning rate for a stochastic gradient descent ("SGD") utilized in determining the distributed word representation, and model architecture. The output layer for the feed-forward neural network language model may be determined in one or more ways as described herein.

In some implementations a neural transfer function (e.g., softmax activation function) may be utilized to calculate the output layer based on the projection layer and one or more hidden layers. In some implementations when a vocabulary is large, a hierarchical neural transfer function may be utilized. In some implementations the distributed word representations may be based on an unnormalized output layer. In such instances, a hinge-loss function may be selected that associates a higher score with the word w selected from the correct next word than for a randomly selected incorrect word $\hat{w}$ from the vocabulary. For example, the hinge-loss function may be selected to be:

$$|1-f_w(x)+f_{\hat{w}}(x)|_+$$

where $|x|_+ = \max(0, x)$. The distributed word representations may then be determined, for example, based on training by back-propagation (e.g., utilizing a mini-batch SGD).

Additional and/or alternative methods of determining distributed word representations may be utilized besides language modeling in natural language processing tasks. For example, the distributed word representations may be determined without language modeling, such as context based next-word probabilities. Instead, a skip-gram model may be utilized to optimize a distributed representation of a given word to predict words that surround the given word in a sentence.

In some implementations identifying the distributed word representations for each of one or more noun phrases may further include identifying a language for the one or more noun phrases, and determining the distributed word representations based on the language. Conventional and/or other techniques may be utilized to determine the syntactic and semantic features based on linguistic knowledge for a well-studied language such as English. However, two languages may include wide syntactic and/or lexical-semantic variations. For example, unlike English, Spanish has grammatical gender agreement between non-personal antecedents such as "la empresa", meaning "the company" and co-referring pronouns such as "la", meaning "it". As another example, French has grammatical gender agreement between non-personal antecedents such as "un livre", meaning "a book", and "les livres", meaning "the books", and respective co-referring pronouns such as "le", meaning "it", and "ils" meaning "they". Any features and rules that may be transferred from English (e.g., to Spanish, French) may fail to capture such gender agreement. Also, a large labeled text segment (e.g., with accurate coreference annotations) may not be available for multiple languages.

In such instances, the noun phrase segmenter 135 may identify a language and further access a labeled text segment in the identified language. The noun phrase segmenter 135 may additionally identify a large unlabeled text segment (e.g., with no coreference annotations) in the identified language and distributed word representations may be determined for the unlabeled text segment. In some implementations the labeled text segment may be utilized to rank all antecedents for any given noun phrase, as described herein.

Feature Representations

For each of the one or more noun phrases, a referring feature representation and an antecedent feature representation may be determined. In some implementations the coreference resolver 130 may determine the referring feature representation and the antecedent feature representation for a noun phrase. In some implementations the referring feature representation of a noun phrase may be indicative of semantic features of the noun phrase as a referring noun phrase. In some implementations the referring feature representation $m_i$ for the noun phrase i may include the distributed word representation $r(w)$, for the noun phrase w, i.e., $m_i = [r(w)]$. The antecedent feature representation for a noun phrase includes the distributed word representation for the noun phrase augmented by one or more antecedent features, where the one or more antecedent features may be indicative of semantic features of the noun phrase as a candidate antecedent noun phrase. In some implementations the referring feature representation may be augmented with at least one referring feature. In some implementations the antecedent feature representation may be augmented with at least one antecedent feature. The referring and/or antecedent feature may include one or more of a type of mention (e.g., named, nominal, pronominal), a type of entity (e.g., person, location, organization), number of words in the noun phrase, and a gender associated with the noun phrase. In some implementations the coreference resolver 130 may access the content database 120 to identify the referring and/or antecedent features associated with the noun phrase.

In some implementations the type of mention for a noun phrase may be identified. As described herein, the type of mention for a noun phrase may be utilized in determining the referring and/or antecedent features associated with the noun phrase. In some implementations the coreference resolver 130 may access the content database 120 to identify the type of mention $t_i$ for the noun phrase i. In some implementations the type of mention $t_i$ may be represented in binary form such as a binary string of length two. For example, "01" may represent a named noun phrase; "10" may represent a nominal noun phrase; and "11" may represent a pronominal noun phrase. Additional types of mentions may be identified, and a binary string may be associated with the type of mention.

In some implementations the type of entity for a noun phrase may be identified. As described herein, the type of entity for a noun phrase may be utilized in determining the referring and/or antecedent features associated with the noun phrase. In some implementations the coreference resolver 130 may access the content database 120 to identify the type of entity $e_i$ for the noun phrase i. In some implementations the type of entity $e_i$ may be represented in binary form such as a binary string of length three. The first position in the string $e_i$ is associated with a digit "0" if the noun phrase is associated with a person; otherwise the first position in the string is associated with a digit "1". The second position in the string $e_i$ is associated with a digit "0" if the noun phrase is associated with a location; otherwise the second position in the string is associated with a digit "1". The third position in the string $e_i$ is associated with a digit "0" if the noun phrase is associated with an organization; otherwise the third position in the string is associated with a digit "1". For example, the string "010" may represent a noun phrase associated with an organization. Additional types of entities may be identified, and a binary string may be associated with the type of entity. For example, a binary string of length four may be utilized to represent four types of entities.

In some implementations the number of words in a noun phrase may be identified. As described herein, the number of words in a noun phrase may be utilized in determining the referring and/or antecedent features associated with the noun phrase. In some implementations the coreference resolver 130 may access the content database 120 to identify the number of words $l_i$ for the noun phrase i. For example, the noun phrase "Barack Obama" has two words; accordingly, $l_i$ may be identified as 2. Also, for example, "PGA Player of the Year" has five words; accordingly, $l_i$ may be identified as 5. In some implementations the number of words $l_i$ for the noun phrase i may be represented in binary form (e.g., 2 may be represented as "10", 5 may be represented as "101").

In some implementations the gender associated with a noun phrase may be identified. As described herein, the gender associated with a noun phrase may be utilized in determining the referring and/or antecedent features associated with the noun phrase. In some implementations the coreference resolver 130 may access the content database 120 to identify the gender $g_i$ associated with the noun phrase i. For example, a letter "M" to denote "Male" may be associated with the noun phrase "Barack Obama", and a letter "F" to denote "Female" may be associated with the noun phrase "Marie Curie". As described herein, gender associations are significant for languages such as Spanish that have grammatical gender agreement between non-personal antecedents such as "la empresa", meaning "the company" and co-referring pronouns such as "la", meaning "it". In some implementations the gender $g_i$ associated with a noun phrase i may be represented in binary form. For example, "0" may be utilized to represent "Male", and "1" may be utilized to represent "Female". Additional and/or alternative referring and/or antecedent features may be associated with a noun phrase. For example, whether the noun phrase is singular or plural, the number of occurrences of the noun phrase in the text segment, a term frequency inverse document frequency ("TF-IDF") for the noun phrase, whether the first letter of the first word of the noun phrase is capitalized, and so forth.

As described herein, in some implementations the referring feature representation may be augmented with at least one referring feature. For example, the referring feature representation for a noun phrase may comprise the distributed word representation for the noun phrase and/or for a head token associated with the noun phrase, and may additionally include one or more of the type of mention, the type of entity, the number of words in the noun phrase, the gender associated with the noun phrase, an indicator for whether the noun phrase is singular or plural, an indicator for whether any letters in the noun phrase are capitalized, and so forth. In some implementations a parse tree may be utilized to identify a head token $h_i$ for a noun phrase i. For example, the referring feature representation $m_i$ for a noun phrase i may be $$m_i = [r(h_i); t_i; e_i; l_i],$$

where $r(h_i)$ is the distributed word representation of the head token $h_i$ associated with the noun phrase, $t_i$ is the type of mention associated with the noun phrase, $e_i$ is the type of entity associated with the noun phrase, and $l_i$ is the number of words in the noun phrase, as described herein.

As described herein, the antecedent feature representation for a noun phrase includes the distributed word representation for the noun phrase augmented by one or more antecedent features, where the one or more antecedent features may be indicative of semantic features of the noun phrase as a candidate antecedent noun phrase. In some implementations the one or more antecedent features may include one or more of the type of mention, the type of entity, the number of words in the noun phrase, the gender associated with the noun phrase, an indicator for whether the noun phrase is singular or plural, an indicator for whether any letters in the noun phrase are capitalized, a tree distance between the two noun phrases, and so forth.

In some implementations a tree distance between two noun phrases may be determined by the coreference resolver 130. For example, the coreference resolver 130 may access the content database 120 to retrieve a parse tree associated with the text segment. In some implementations each sentence in the text segment may be associated with a parse tree. In some implementations the coreference resolver 130 may generate a parse tree for all or part of a text segment. For a noun phrase i, the parse tree may be utilized to identify a head token $h_i$ of i. For another noun phrase j in the same sentence as i, a tree distance $d(i,j)$ may be identified, where $d(i,j)$ is a length of a path between i and j, based on the length of a path between head tokens $h_i$ and $h_j$, respectively, in the parse tree. In some implementations i and j may belong to different sentences. In such instances, the tree distance $d(i,j)$ may be based on the number of intervening sentences between i and j. For example, $d(i,j)$ may be a sum of depths of head tokens $h_i$ and $h_j$ within their respective parse trees (e.g., associated with their respective sentences), and the number of sentences between them.

In some implementations the antecedent feature representation for an antecedent noun phrase may be the distributed word representation for the antecedent noun phrase augmented by one or more antecedent features of the antecedent noun phrase. For example, the antecedent feature representation $a_j$ for a candidate antecedent noun phrase j, associated with a referring noun phrase i may be:

$$a_j = [r(h_j); d(i,j)],$$

where $r(h_j)$ is the distributed word representation of the head token $h_j$ associated with the noun phrase j, and $d(i,j)$ is the length of a path between the referring noun phrase i and the candidate antecedent noun phrase j, as described herein. As another example, the antecedent feature representation $a_j$ for a candidate antecedent noun phrase j, associated with a referring noun phrase i may be $$a_j = [r(h_j); t_j; e_j; l_j; d(i,j)],$$

where $r(h_j)$ is the distributed word representation of the head token $h_j$ associated with the noun phrase j, $t_j$ is the type of mention associated with the noun phrase j, $e_j$ is the type of entity associated with the noun phrase j, $l_j$ is the number of words in the noun phrase j, and $d(i,j)$ is the length of a path between the referring noun phrase i and the candidate antecedent noun phrase j, as described herein.

In some implementations the antecedent feature representation for an antecedent noun phrase may be the referring feature representation for the antecedent noun phrase as a referring noun phrase augmented by a distance on a parse tree between the candidate antecedent noun phrase and a referring noun phrase. For example, the antecedent feature representation $a_j$ for a candidate antecedent noun phrase j, associated with the referring noun phrase i may be $$a_j=[m_j;d(i,j)],$$

where $m_j$ is the referring feature representation for the antecedent noun phrase j as a referring noun phrase, and d(i,j) is the length of a path between the referring noun phrase i and the candidate antecedent noun phrase j, as described herein.

In some implementations a noun phrase may be identified as a null antecedent in a collection of co-referential noun phrases. In some implementations the null antecedent may be the first appearance of the noun phrase in the text document. For example, the entities "Barack Obama", "the President", "Obama", "Barack", and "he" may be referring noun phrases. Based on a ranking as described herein, "Barack Obama" may be identified as a candidate antecedent noun phrase associated with a ranking that is higher than the rankings associated with the candidate antecedent noun phrases "the President", "Obama", "Barack", and "he". Based at least in part on such determination, "Barack Obama" may be identified as a null antecedent for the referring noun phrases "the President", "Obama", "Barack", and "he".

An antecedent feature representation for the null antecedent $a_i^0$, associated with a referring noun phrase i may be:

$$a_i^0=[r(\emptyset);t_i;e_i;l_i;d(i,i)],$$

where $r(\emptyset)$ is a distributed word representation that may be associated with a head token $\emptyset$ that does not appear in the text segment, and d(i,i)=0. In some implementations the antecedent feature representation for the null antecedent may be a zero vector, i.e., each component of the vector is zero. In some implementations the antecedent feature representation for the null antecedent may be a word representation of a word that does not appear appears in the text segment.

Learned Coreference Embeddings

As described herein, the referring feature representations and the antecedent feature representations may be vectors of varying lengths. In some implementation the referring feature representations and the antecedent feature representations may be embedded into a common space via coreference embeddings, where the coreference embeddings may be indicative of coreference resolution. The coreference embeddings may be learned. In some implementations the learning may be based on an iterative algorithm, such as an algorithm that optimizes a loss function relevant to coreference resolution. For example, a stochastic gradient descent method may be utilized to learn the coreference embeddings. In some implementations the loss function may be indicative of a number of incorrect candidate antecedent noun phrases associated with a referring noun phrase.

In some implementations the referring feature representation may be a vector in an m-dimensional space $R^m$, and the antecedent feature representation may be a vector in an n-dimensional space $R^n$. These vectors may be iteratively embedded into a common k-dimensional space $R^k$ via iteratively learned coreference embeddings $\phi,\gamma$ respectively given as:

$$\phi:R^m \to R^k; \gamma:R^n \to R^k.$$

In some implementations distance measures between a referring noun phrase and one or more candidate antecedent noun phrases may be determined. For example, the distance measures may be determined in the common k-dimensional space $R^k$ based on the coreference embeddings $\phi,\gamma$. The distance measures are indicative of proximity of co-referential noun phrases. For example, an inner product of the embedded referring feature representations and the antecedent feature representations may be utilized to determine the distance measures. In some implementations the iteratively learned coreference embeddings $\phi,\gamma$ may be linear maps with associated matrices M, and A, respectively. For example, $\phi(m_i)=Mm_i$, $\gamma(a_j)=Aa_j$. In such instances, an inner product may be identified as f(i,j), defined as:

$$f(i,j)=\phi(m_i)^T\gamma(a_j)=(Mm_i)^T(Aa_j)=(m_i)^TM^TAa_j.$$

In some implementations a distance measure may be identified based on the inner product f(i,j).

In some implementations a loss function may be identified based on the inner product f(i,j). In some implementations the coreference resolver 130 may access the content database 120 to retrieve training data that may include labeled data. Such labeled data may include co-referential annotations of the one or more noun phrases appearing in the text. Based on such labeled data, the coreference resolver 130 may identify positive and negative sets of candidate antecedents.

For example, for each referring noun phrase i, a candidate antecedent noun phrase j may be identified. The candidate antecedent noun phrase j may be determined to be in a positive set of candidate antecedents $a^+(i)$, and a negative set of candidate antecedents $a^-(i)$. A noun phrase j belongs to $a^+(i)$ if (j,i) is a positive training pair for coreference. For example, $a^+(i)$ may be defined so that each referential pronominal noun phrase i has exactly one non-pronominal candidate antecedent noun phrase j. The noun phrase j may belong to $a^-(i)$ if (j,i) is a negative training pair for coreference. In some implementations this may be determined based on a training rule to learn coreference embeddings, where the training rule selects the members of $a^-(i)$ as noun phrases j that may not be candidate antecedents for i. For example, "Barack Obama" cannot be a candidate antecedent for "she". Accordingly, the noun phrase "Barack Obama" may belong to the negative set of candidate antecedents $a^-$("she") associated with the referring noun phrase "she". Such positive and negative training pairs may be utilized to learn coreference embeddings as described herein.

In some implementations a loss function may be identified based on the positive and negative sets of candidate antecedents and the inner product f(i,j). In some implementations the loss function may be chosen to be indicative of the number of incorrect antecedents. For example, a loss function for a text segment D may be determined as:

$$L(D)=\sum_i \sum_{j \in a^+(i)} \sum_{j' \in a^-(i)} |1+f(i,j')-f(i,j)|_+,$$

where $|x|_+=\max(0,x)$. Accordingly, if the incorrect candidate antecedents (members of $a^-(i)$) exceed the number of correct antecedents (members of $a^+(i)$) by one, then a loss may be incurred. The iteratively learned coreference embeddings $\phi,\gamma$ may be selected to minimize the loss function. Additional and/or alternative loss functions may be utilized to iteratively learn the coreference embeddings.

Coreference Resolution

In some implementations a score may be associated with each pair of a candidate antecedent noun phrase and an associated referring noun phrase. The score may be based on the determined distance measures. For example, a noun phrase i and its associated candidate antecedent noun phrase j may be associated with a pair (j,i), and a score for the pair may be determined based on a distance measure associated with the pair. For example, the score for the pair (j,i) may be the inner product f(i,j).

For a referring noun phrase, the ranking system 150 may rank the one or more candidate antecedent noun phrases associated with the referring noun phrase. The ranking may be based on the score for the pair comprising of the candidate antecedent noun phrase and the referring noun phrase. An antecedent noun phrase of the one or more candidate antecedent noun phrases may be selected based on the ranking. As described herein, for each of the one or more noun phrases in a document, candidate antecedents may be identified and ranked. In some implementations candidate antecedents associated with a referring noun phrase may be grouped based on the ranking and/or scoring. In some implementations the highest ranked candidate antecedent in each group may be selected as the antecedent noun phrase associated with the referring noun phrase.

In some implementations the grouping may be determined based on a graph. Each node of the graph may be representative of a noun phrase appearing in the document. For a pair of nodes, a link may be associated with the pair based on the coreference relationship between the two nodes in the pair. However, not every pair of nodes may be associated with a link. A link may be a selection link, or a blocking link. A selection link is indicative of two nodes in a pair as being potentially co-referential noun phrases. For example, the pair (Barack Obama, he) may be associated with a selection link if the noun phrase "Barack Obama" is a candidate antecedent for the noun phrase "he". A blocking link is indicative of two nodes in a pair as being potentially non-co-referential noun phrases. For example, the pair (Barack Obama, she) may be associated with a blocking link based at least in part on a determination that the noun phrase "Barack Obama" cannot be a candidate antecedent for the noun phrase "she".

In some implementations a selection link may be further associated with a score. Such a ranked selection link may be referred to as a scoring link. For example, in the text segment "Barack Obama met with John Boehner at the White House. The President told the Speaker that his primary concern was to avoid the fiscal cliff", each pair (John Boehner, Speaker) and (John Boehner, his) may be associated with a score; the pair (John Boehner, Speaker) may be associated with a score more indicative of being potentially co-referential noun phrases than the pair (John Boehner, his). Accordingly, the pairs (John Boehner, Speaker) and (John Boehner, his) are scoring links. Generally speaking, for each noun phrase, the candidate antecedents associated with the higher scores may be selected and/or scored, whereas the candidate antecedents associated with the lower scores may be blocked. In some implementations a threshold may be identified and candidate antecedents associated with scores that satisfy the threshold may be selected and/or scored, whereas the candidate antecedents associated with scores that fail to satisfy the threshold may be blocked.

The noun phrases may then be sorted into one or more groups based on the graph and the links. In some implementations the coreference resolver 130 may associate an ordering for the noun phrases that appear in the document, where the ordering may be based on the order of appearance of the noun phrase in the document. For example, the underlined noun phrases in the text segment "Barack Obama met with John Boehner at the White House. The President told the Speaker that his primary concern was to avoid the fiscal cliff" may be ordered as "1. Barack Obama; 2. John Boehner; 3. President; 4. Speaker; and 5. His," based on the order of their appearance in the text segment. In some implementations the coreference resolver 130 may iterate through the noun phrases in the order of their appearance in determining the one or more groups.

For example, the noun phrases appearing in a document may be ordered as $\{N_1, N_2, \ldots, N_t\}$. The coreference resolver 130 may begin the iterative step with the first noun phrase $N_1$. Since the first noun phrase $N_1$ does not have any antecedents, a first group $G_1$ may be created, where the first group $G_1$ may include the first noun phrase $N_1$, i.e., $G_1=\{N_1\}$. The coreference resolver 130 may next identify the second noun phrase $N_2$. If the pair $(N_1, N_2)$ is associated with a blocking link, then $N_2$ is blocked from the group $G_1$. Accordingly, a second group $G_2$ may be created, where the second group $G_2$ may include the second noun phrase $N_2$, i.e., $G_1=\{N_1\}$, and $G_2=\{N_2\}$. If the pair $(N_1, N_2)$ is associated with a selection link, then $N_2$ may be included in the first group, i.e., $G_1=\{N_1, N_2\}$.

The coreference resolver 130 may next identify the third noun phrase $N_3$. In the instance where $G_1=\{N_1, N_2\}$, if either of the pairs $(N_1, N_3)$, $(N_2, N_3)$ is associated with a blocking link, then $N_3$ is blocked from the first group $G_1$, and a third group $G_3$ may be created, where the third group $G_3$ may include the third noun phrase $N_3$, i.e., $G_1=\{N_1, N_2\}$, and $G_3=\{N_3\}$; otherwise it is included in the first group, i.e., $G_1=\{N_1, N_2, N_3\}$.

In the instance where $G_1=\{N_1\}$, and $G_2=\{N_2\}$, coreference resolver 130 may group $N_3$ as follows: if both the pairs $(N_1, N_3)$, $(N_2, N_3)$ are associated with blocking links, then $N_3$ is blocked from the groups $G_1$ and $G_2$. Accordingly, a third group $G_3$ may be created, where the third group $G_3$ may include the third noun phrase $N_3$, i.e., $G_1=\{N_1\}$, $G_2=\{N_2\}$, and $G_3=\{N_3\}$. If the pair $(N_1, N_3)$ is associated with a blocking link, whereas the pair $(N_2, N_3)$ is associated with a selection link, then $N_3$ is blocked from the group $G_1$ and included in the group $G_2$, i.e., $G_1=\{N_1\}$, and $G_2=\{N_2, N_3\}$. Likewise, if the pair $(N_2, N_3)$ is associated with a blocking link, whereas the pair $(N_1, N_3)$ is associated with a selection link, then $N_3$ is blocked from the group $G_2$ and included in the group $G_1$, i.e., $G_2=\{N_2\}$, and $G_1=\{N_1, N_3\}$.

In some implementations both pairs $(N_1, N_3)$, and $(N_2, N_3)$ may be associated with selection links. In such instances, the determined scoring may be utilized to distinguish between the selection links as scoring links. For example, the score that associated with the scoring link for $(N_1, N_3)$ may be higher than the score associated with the scoring link for $(N_2, N_3)$. Accordingly, $N_3$ may be included in the group $G_1$, i.e., $G_2=\{N_2\}$, and $G_1=\{N_1, N_3\}$. As another example, the score associated with the scoring link for $(N_2, N_3)$ may be higher than the score associated with the scoring link for $(N_1, N_3)$. Accordingly, $N_3$ may be included in the group $G_2$, i.e., $G_1=\{N_1\}$, and $G_2=\{N_2, N_3\}$.

In some implementations the scores associated with the scoring link for $(N_1, N_3)$ may be identical to the score associated with the scoring link for $(N_2, N_3)$. In such an instance, a new group may be created to include $N_3$. Generally speaking, a blocking link bars the inclusion of a noun phrase in a group; however a selection and/or scoring link may not guarantee inclusion is a group. In some implementations the coreference resolver 130 may iterate through the noun phrases in the order of their appearance in determining the one or more groups based on the iterative process described herein.

Referring to FIG. 4, an example text segment is illustrated. One or more noun phrases in the first paragraph have been underlined. The coreference resolver 130 may order the one or more noun phrases based on their order of appearance in the first paragraph. For example, the noun phrases may be ordered as "1. John Duh; 2. founder; 3. Duh.com; 4. reporters; 5. his; 6. Baseball Team; 7. he; and 8. Team".

Figure 5A:
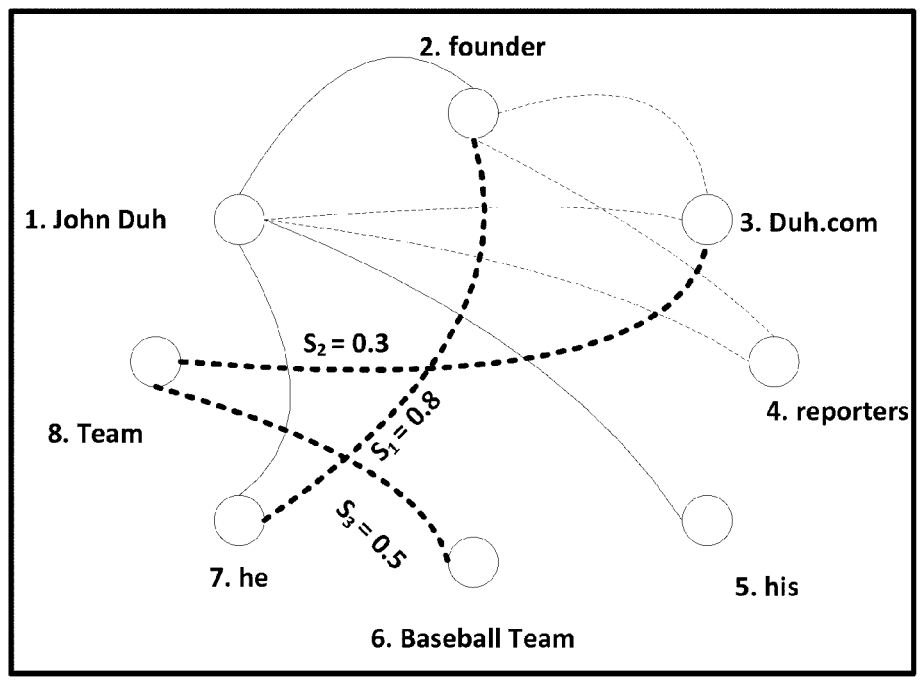

Referring to FIGS. 5A-5K, an example method to group noun phrases is illustrated. FIG. 5A illustrates the noun phrases identified in the example in FIG. 4, along with a link associated with each pair of noun phrases. In this example, selection links are represented with solid lines. For example, the pairs (John Duh, founder), (John Duh, his), and (John Duh, he) are associated with selection links. Blocking links are represented with dotted lines. For example, the pairs (John Duh, Duh.com), (John Duh, reporters), (founder, Duh.com), and (founder, reporters) are associated with blocking links. Scoring links are represented with long-dashed lines. As described herein, selection links may be associated with a score based on the determined distance measures. For example, (founder, he) may be associated with a scoring link with an associated score $S_1=0.8$; (Duh.com, Team) may be associated with a scoring link with an associated score $S_2=0.3$; and (Baseball Team, Team) may be associated with a scoring link with an associated score $S_3=0.5$. In some implementations every selection link may be associated with a score.

Figure 5B:
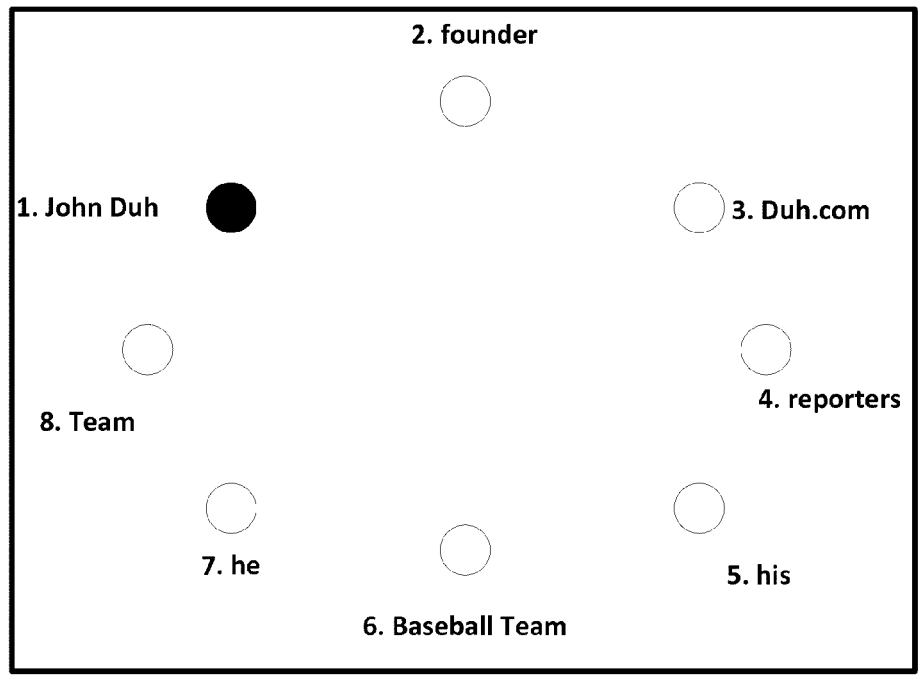

FIG. 5B illustrates the first step in an example iterative process to group the one or more noun phrases. The coreference resolver 130 may begin the iterative step with the first noun phrase "John Duh". Since the first noun phrase "John Duh" does not have any antecedents, a first group $G_1$ may be created, where the first group $G_1$ may include the first noun phrase "John Duh", i.e., $G_1=\{$John Duh$\}$. In some implementations "John Duh" may be determined to be a null antecedent.

Figure 5C:
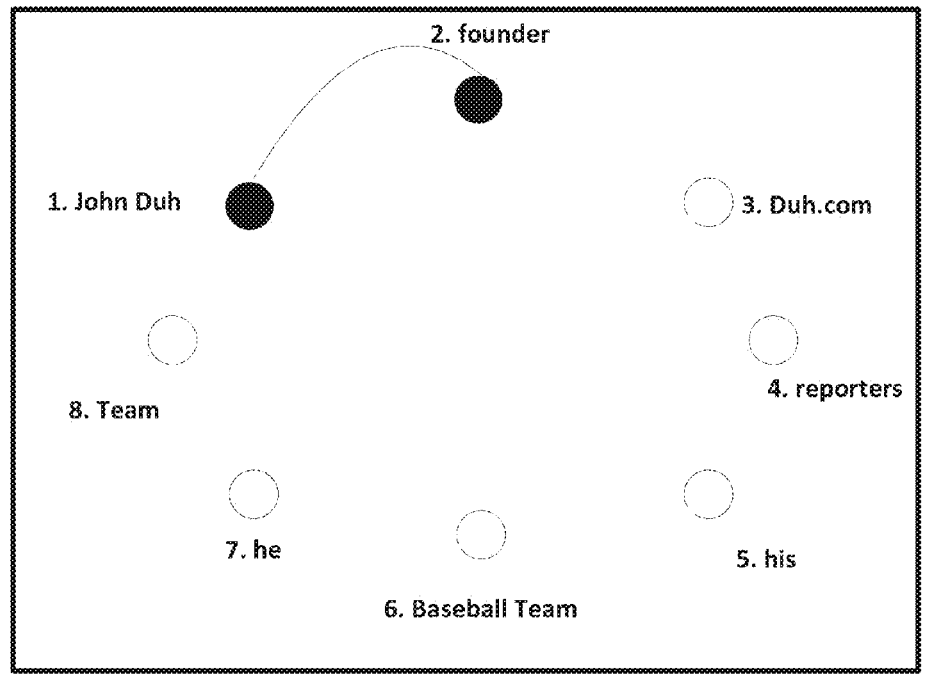

FIG. 5C illustrates the second step in the example iterative process to group the one or more noun phrases. The coreference resolver 130 may next identify the second noun phrase "founder". Since the pair (John Duh, founder) is associated with a selection link, the noun phrase "founder" may be included in the first group, i.e., $G_1=\{$John Duh, founder$\}$.

Figure 5D:
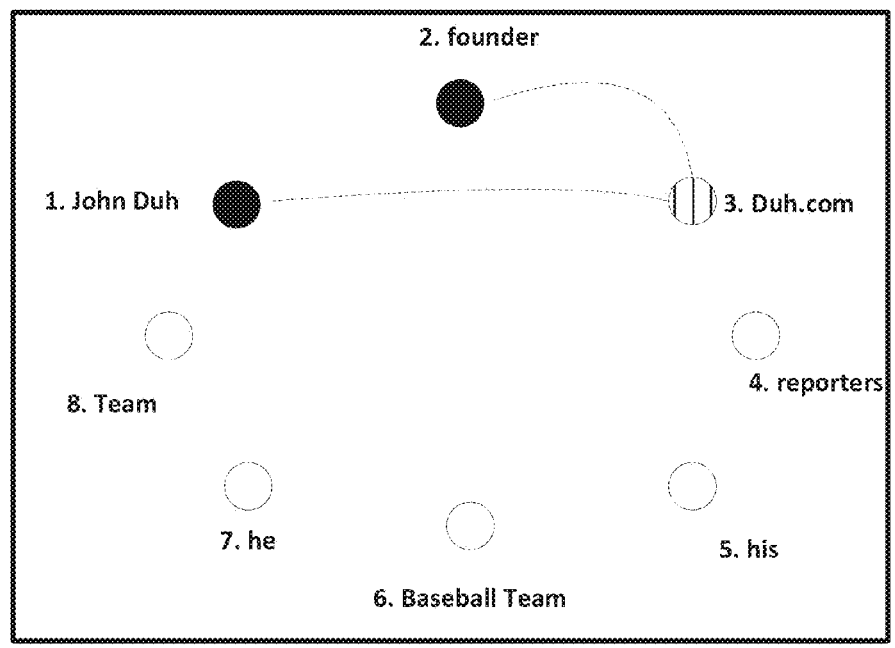

FIG. 5D illustrates the next step in the example iterative process to group the one or more noun phrases. The coreference resolver 130 may next identify the third noun phrase "Duh.com". The pairs (John Duh, Duh.com), and (founder, Duh.com) are associated with blocking links; therefore, the noun phrase "Duh.com" is blocked from the group $G_1$. Accordingly, a second group $G_2$ may be created, where the second group $G_2$ may include the noun phrase "Duh.com", i.e., $G_1=\{$John Duh, founder$\}$, and $G_2=\{$Duh.com$\}$.

Figure 5E:
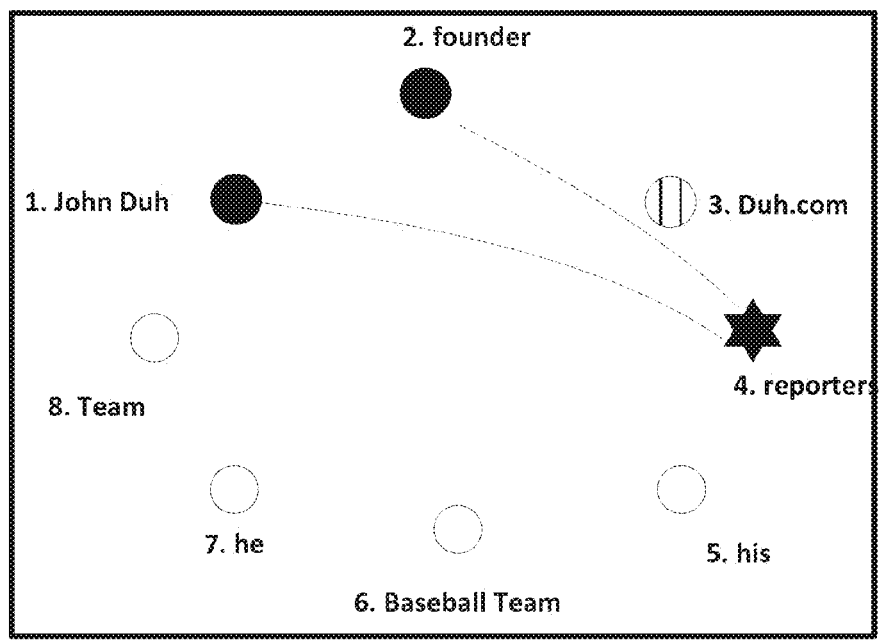

FIG. 5E illustrates the next step in the example iterative process to group the one or more noun phrases. The coreference resolver 130 may identify the next noun phrase "reporters". The pairs (John Duh, reporters), and (founder, reporters) are associated with blocking links; therefore, the noun phrase "reporters" is blocked from the group $G_1$. Also, as illustrated, the pair (Duh.com, reporters) is not associated with a link. Accordingly, a third group $G_3$ may be created, where the third group $G_3$ may include the noun phrase "reporters", i.e., $G_1=\{$John Duh, founder$\}$, $G_2=\{$Duh.com$\}$, and $G_3=\{$reporters$\}$.

Figure 5F:
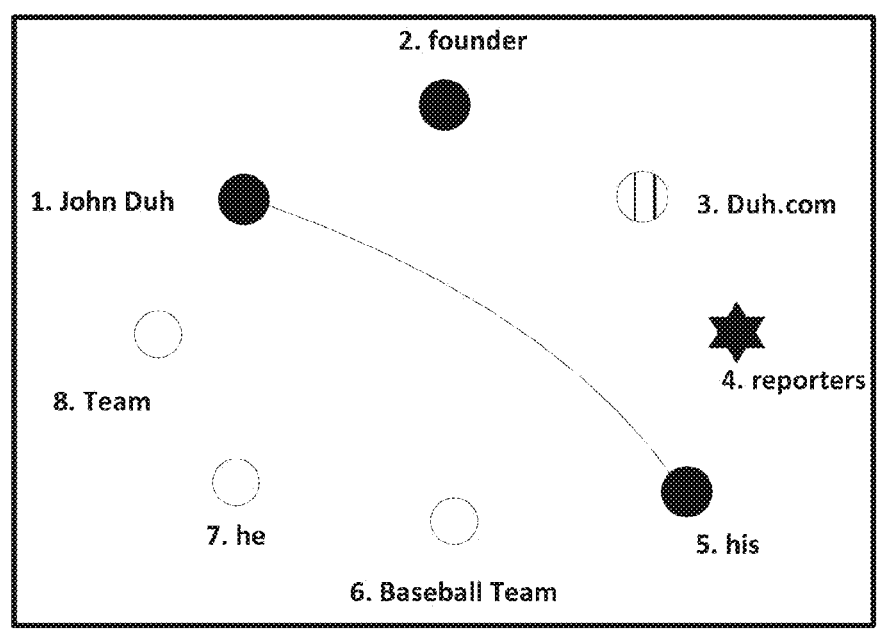

FIG. 5F illustrates the next step in the example iterative process to group the one or more noun phrases. The coreference resolver 130 may identify the next noun phrase "his". The pair (John Duh, his) is associated with a selection link, and the pair (founder, his) is not associated with a blocking link. Accordingly, the noun phrase "his" may be included in the first group, i.e., $G_1=\{$John Duh, founder, his$\}$, $G_2=\{$Duh.com$\}$, and $G_3=\{$reporters$\}$.

Figure 5G:
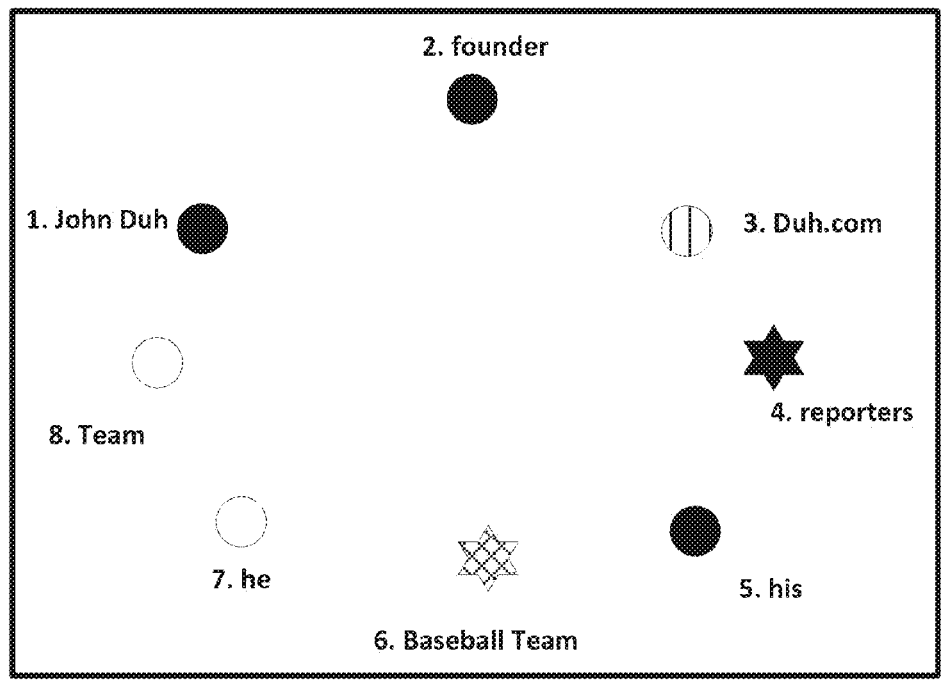

FIG. 5G illustrates the next step in the example iterative process to group the one or more noun phrases. The coreference resolver 130 may identify the next noun phrase "Baseball Team". As illustrated, pairs that include the noun phrase "Baseball Team" are not associated with links. For example, there are no links associated with the pairs (John Duh, Baseball Team), (founder, Baseball Team), (Duh.com, Baseball Team), (reporters, Baseball Team), and (his, Baseball Team). Accordingly, a fourth group $G_4$ may be created, where the fourth group $G_4$ may include the noun phrase "Baseball Team", i.e., $G_1=\{$John Duh, founder, his$\}$, $G_2=\{$Duh.com$\}$, $G_3=\{$reporters$\}$, and $G_4=\{$Baseball Team$\}$.

Figure 5H:
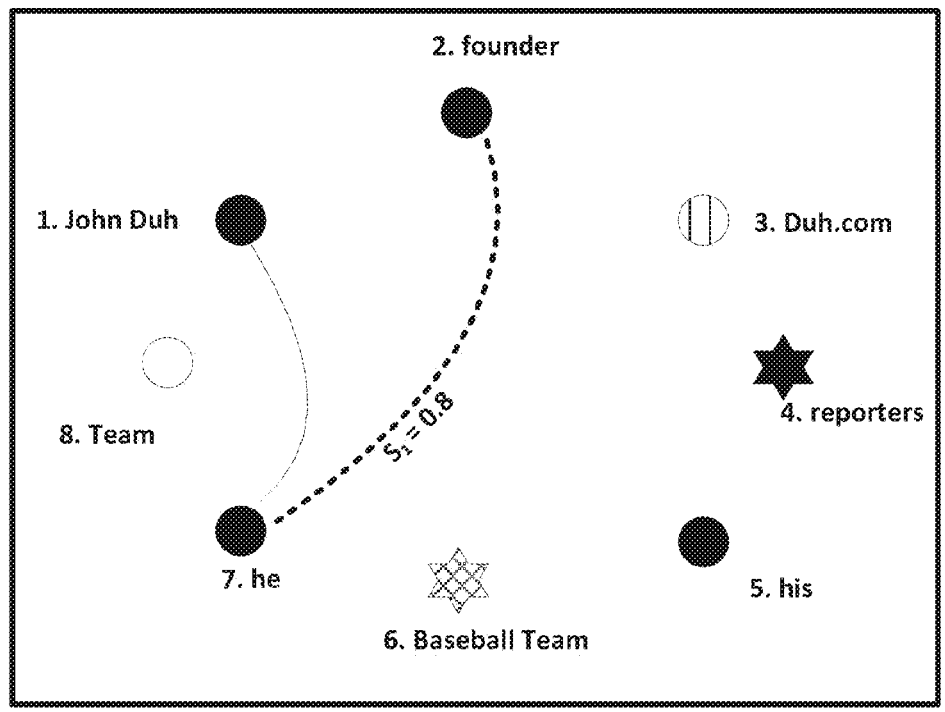

FIG. 5H illustrates the next step in the example iterative process to group the one or more noun phrases. The coreference resolver 130 may identify the next noun phrase "he". As illustrated, the pair (John Duh, he) is associated with a selection link, and the pair (founder, he) is associated with a scoring link with an associated score $S_1=0.8$. Accordingly, based at least in part on a determination that a scoring link is more indicative of two noun phrases as being potentially co-referential noun phrases than a selection link, the coreference resolver 130 may identify the group that includes the noun phrase "founder" as a candidate group to include the noun phrase "he". The coreference resolver 130 may additionally identify that there is no blocking link associated with the pair (his, he). Accordingly, the noun phrase "he" may be included in the first group, i.e., $G_1=\{$John Duh, founder, his, he$\}$, $G_2=\{$Duh.com$\}$, $G_3=\{$reporters$\}$, and $G_4=\{$Baseball Team$\}$.

Figure 5I:
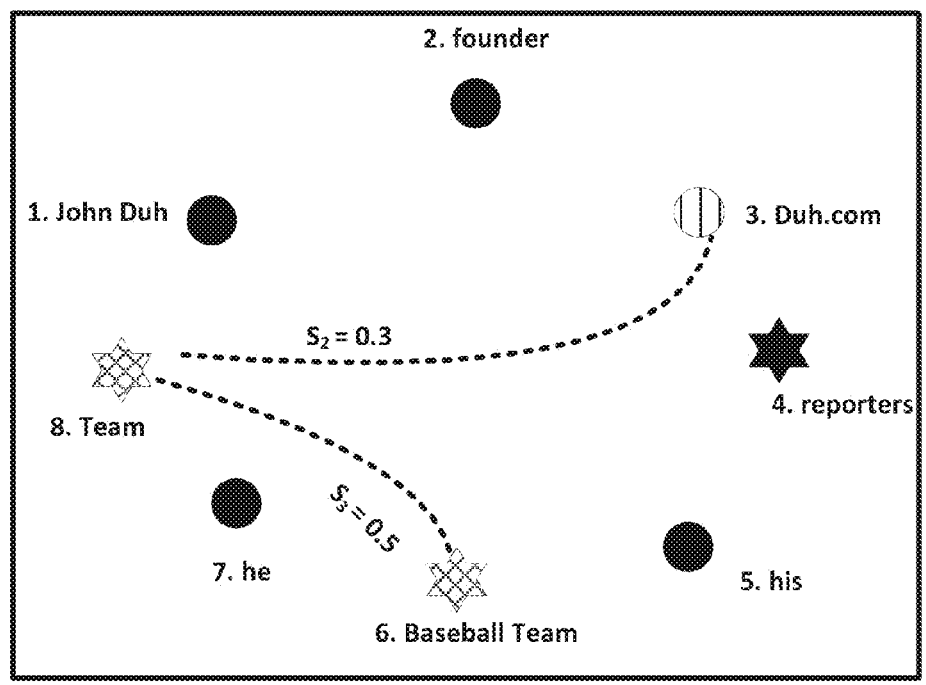

FIG. 5I illustrates the next step in the example iterative process to group the one or more noun phrases. The coreference resolver 130 may identify the next noun phrase "Team". As illustrated, the pair (Duh.com, Team) is associated with a scoring link with an associated score $S_2=0.3$; and the pair (Baseball Team, Team) is associated with a scoring link with an associated score $S_3=0.5$. Accordingly, based at least in part on a determination that the score $S_3=0.5$ associated with the pair (Baseball Team, Team) is more indicative of two noun phrases as being potentially co-referential noun phrases than the score $S_2=0.3$ associated with the pair (Duh.com, Team), the coreference resolver 130 may include the noun phrase "Team" in the group that includes the noun phrase "Baseball Team", i.e., $G_1=\{$John Duh, founder, his, he$\}$, $G_2=\{$Duh.com$\}$, $G_3=\{$reporters$\}$, and $G_4=\{$Baseball Team, Team$\}$.

Figure 5J:
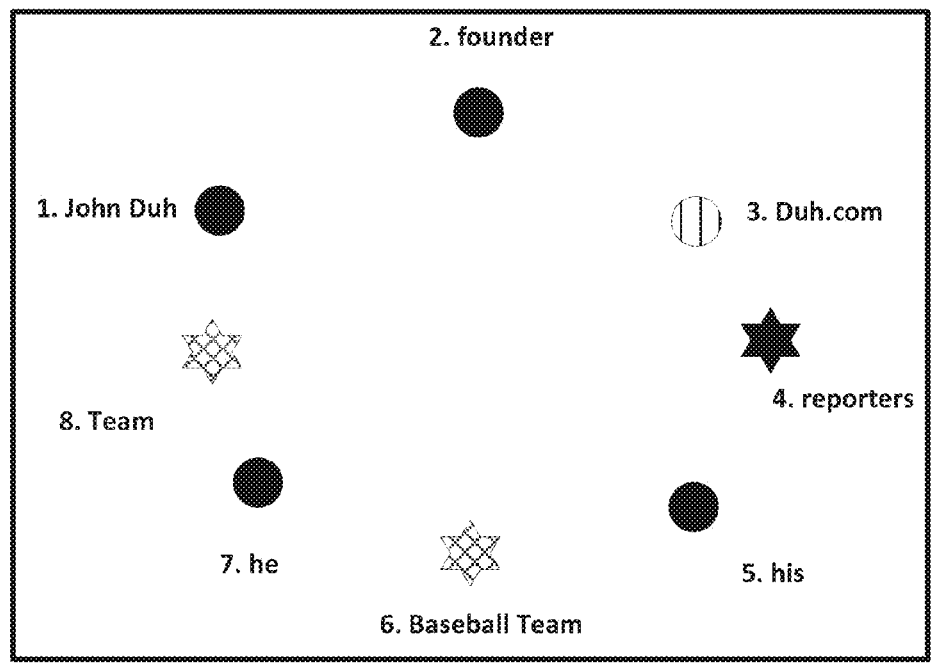

FIG. 5J illustrates the next step in the example iterative process to group the one or more noun phrases. The coreference resolver 130 may determine that the list of noun phrases has been exhausted. In some implementations this may indicate a terminal step for the iterative process. As illustrated, the one or more noun phrases have been grouped into four distinct groups.

The selected antecedent noun phrase may be associated as the antecedent for the referring noun phrase. FIG. 5K illustrates an example table based on the process to group the one or more noun phrases as described with reference to FIGS. 5A-5H. The first column lists the four groups $G_1$, $G_2$, $G_3$, and $G_4$; the second column lists a symbol associated with each group (as illustrated in FIGS. 5B-5H), and the third column lists the members of each group. In some implementations each referring noun phrase may be associated with an antecedent noun phrase. For example, based at least in part on a comparison of the orders of appearance of the noun phrases in the text segment, "John Duh" may be determined to be an antecedent noun phrase associated with the noun phrases "founder", "his", and "he" in the first group $G_1$. As another example, "Baseball Team" may be determined to be an antecedent noun phrase associated with the noun phrase "Team" in the fourth group $G_4$, based at least in part on the appearance of "Baseball Team" before the appearance of "Team" in the text segment.

In some implementations, the methods and apparatus described herein may be utilized to disambiguate one or more noun phrases in a text segment that are in a language other than English. In some implementations the noun phrase segmenter 135 may identify a language and further access a labeled text segment in the identified language. The noun phrase segmenter 135 may additionally identify a large unlabeled text segment (e.g., with no coreference annotations) in the identified language. As described herein, distributed word representations may be determined for the one or more noun phrases in the unlabeled text segment. The labeled text segment may be utilized to determine the referring feature representations and the antecedent feature representations for the one or more noun phrases appearing in the labeled text segment. As described herein, the referring feature representations and the antecedent feature representations may be embedded in a common space. The coreference embeddings may be learned. In some implementations the learning may be based on an iterative algorithm, such as an iterative algorithm that optimizes a loss function for the text segment. The iterative learning based on the loss function allows bootstrapping of co-referential annotations of the one or more noun phrases in the unlabeled text segment based on the known co-referential annotations of the one or more noun phrases in the labeled text segment.

In some implementations, the methods and apparatus described herein may be utilized to disambiguate potentially ambiguous noun phrases in a search query session. For example, a user may issue one or more search queries that include a plurality of noun phrases. For example, the user may issue the following search queries: "How old is Barak Obama", "Who is he married to", "What does her brother do" and "Who did he play basketball for?". The methods and apparatus disclosed herein may utilize one or more determined coreference resolutions to determine that the pronoun "he" in the second query refers to "Barack Obama" and provide the user with search results responsive to a first modified query: "Who is Barack Obama married to". In some implementations a database such as an entity database and/or one or more search result documents may be utilized, based on the first modified query, to identify "Michelle Obama" as the information sought by the first modified query. The methods and apparatus disclosed herein may further disambiguate the pronoun "her" in the third query by identifying that "her" refers to "Michelle Obama." The user may then be provided with search results that are responsive to a second modified query: "What does Michelle Obama's brother do." Finally, the methods and apparatus disclosed herein may disambiguate the pronoun "he" in the last query by identifying it as referring to Michelle Obama's brother, and provide search result documents responsive to such query.

In some implementations users may interact with the coreference resolver 130 through one or more client devices 110. For example, a search system may receive one or more queries issued by the user and may provide the one or more queries to the coreference resolver 130. The client device 110, the content database 120, the coreference resolver 130, the noun phrase segmenter 135, and/or the ranking system 140, may each include memory for storage of data and software applications, a processor for accessing data and executing applications, and components that facilitate communication over the communication network 101. The client devices 110 may execute applications, such as web browsers (e.g., web browser 115 executing on client device 110), that allow users to formulate queries and submit them to the search system. The search system may provide the queries to the coreference resolver 130. The coreference resolver 130 may annotate the queries and provide them to the search system. Based at least in part on the annotated queries, the search system may identify content which matches the queries, and may respond by generating search results that are provided to the one or more client devices 110 in a form that can be presented to the users. For example, in response to a query from the client device 110, the search system may provide a search results web page to be displayed in the web browser 115 executing on the client device 110. The content database 120, the coreference resolver 130, the noun phrase segmenter 135, and/or the ranking system 140 may be implemented in hardware, firmware, and/or software running on hardware. For example, one or more of the systems may be implemented in one or more computer servers.

Referring to FIG. 6, a flow chart illustrates an example method of determining coreference resolution using distributed word representations. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, the coreference resolver 130, the noun phrase segmenter 135, and/or the ranking system 140 of FIG. 1.

At step 600, a text segment may be identified. A text segment may be, for example, all of the text in a document, part of the text in a document, a textual transcript of a document, an identified corpus of documents, and/or all or parts of the text in a collection of documents. A document may include a web page, a post on a social networking platform, an email communication, a text document, and/or multimedia content. In some implementations a text segment may include content of one or more queries issued by a user (e.g., search query, navigational query, and locational directional query).

At step 610, one or more noun phrases may be identified in the text segment. A noun phrase is a phrase that has a noun (e.g., a name) and/or indefinite pronoun (e.g., she, it, they) as its head token. The head token of a noun phrase determines its syntactic type. For example, in the phrase "dining room" the head token is "room", thereby defining "dining room" as a noun phrase, instead of a verb phrase or an adjective phrase.

Noun phrases may be of one or more mention types including named, nominal, and/or pronominal. For example, "Barack Obama" is a named noun phrase, "President" is a nominal noun phrase, and "he" is a pronominal noun phrase. One or more noun phrases in a given text segment may be co-referential. Co-referential noun phrases refer to the same entity. For example, in a given text segment, "Barack Obama" may be referred to as "Mr. Obama", "Mr. President", and "he".

A noun phrase may be a referring noun phrase and/or an antecedent noun phrase. An antecedent noun phrase is a noun phrase that precedes a given noun phrase in a text segment, and the given noun phrase refers to the antecedent noun phrase. The given noun phrase is also called a referring noun phrase. For example, the noun phrases "President", and "he" are referring noun phrases that refer to the antecedent noun phrase "Barack Obama".

In some implementations the noun phrase segmenter 135 may identify every noun phrase that appears in the text segment. In some implementations the one or more noun phrases may be identified based on one or more criteria, including a type of document, a type of query to which a document may be responsive, and/or term frequencies for noun phrases appearing in the text segment. For example, a threshold may be identified and noun phrases associated with term frequencies that satisfy the threshold may be identified.

At step 620, distributed word representations for each of the one or more noun phrases may be identified. The distributed word representations are indicative of syntactic and semantic features of the one or more noun phrases. Syntactic features include syntactic configurations and constraints that may influence coreference relations among noun phrases. For example, syntactic features may include grammatical gender agreement. Semantic features may include domain features, domain features, such as semantic agreement between selectional restrictions on a pronominal predicate argument and a semantic type of the antecedent. In some implementations such features may depend on one or more semantic resources, such as type information in a knowledge base linked to potential antecedents, or unsupervised distributional models that may measure semantic compatibility between two noun phrases. For example, the mention type of a noun phrase may be based on the knowledge base.

Distributed word representations may be identified for the one or more noun phrases. Contextually similar noun phrases may have distributed word representations that are proximate to each other in an embedded space. For example, the noun phrases "Planet", "Galaxy", "constellation", and "Cassiopeia" may be identified to have distributed word representations that are proximate to the noun phrase "Andromeda" based on contextual analysis of a text segment that describes astronomical objects; whereas the noun phrases "Helen", "Troy", "Greece", "mythology", and "Perseus", may be identified to have distributed word representations that are proximate to the noun phrase "Andromeda" based on contextual analysis of a text segment that describes Greek mythology.

In some implementations the coreference resolver 130 may access the content database 120 to retrieve distributed word representations for the one or more noun phrases in the text segment. In some implementations identifying the distributed word representations for each of one or more noun phrases may further include identifying a language for the one or more noun phrases, and determining the distributed word representations based on the language.

At step 630, for each of the one or more noun phrases, a referring feature representation and an antecedent feature representation may be determined. In some implementations the coreference resolver 130 may determine the referring feature representation and the antecedent feature representation for a noun phrase. In some implementations the referring feature representation may be indicative of semantic features of the noun phrase as a referring noun phrase. In some implementations the referring feature representation $m_i$ for the noun phrase i may include the distributed word representation r(w), for the noun phrase w, i.e., $m_i=[r(w)]$.

In some implementations the referring feature representation for a noun phrase may include the distributed word representation for the noun phrase and/or for the head token associated with the noun phrase. In some implementations the referring feature representation may be augmented with at least one referring feature, one or more of a type of mention, a type of entity, number of words in the noun phrase, gender associated with the noun phrase, an indicator for whether the noun phrase is singular or plural, an indicator for whether any letters in the noun phrase are capitalized, and so forth.

In some implementations for each referring noun phrase, a candidate antecedent noun phrase may be identified. The candidate antecedent noun phrase may be determined to be in a positive set of candidate antecedents and a negative set of candidate antecedents. A noun phrase belongs to the positive set of candidate antecedents if it is a positive training pair for coreference. Likewise, a noun phrase belongs to the negative set of candidate antecedents if it is a negative training pair for coreference. For example, "Barack Obama" cannot be a candidate antecedent for "she". Accordingly, the noun phrase "Barack Obama" may belong to the negative set of candidate antecedents associated with the referring noun phrase "she". Such positive and negative training pairs may be utilized in learning coreference embeddings as described herein.

The antecedent feature representation for a noun phrase may include the distributed word representation for the noun phrase augmented by one or more antecedent features, where the one or more antecedent features are indicative of semantic features of the noun phrase as a candidate antecedent noun phrase. In some implementations the one or more antecedent features may include one or more of the type of mention, the type of entity, the number of words in the noun phrase, the gender associated with the noun phrase, an indicator for whether the noun phrase is singular or plural, an indicator for whether any letters in the noun phrase are capitalized, a tree distance between the two noun phrases, and so forth.

At step 640, coreference embeddings of the referring and antecedent feature representations may be learned. In some implementations the coreference embeddings may be learned based on an iterative algorithm, such as an algorithm that optimizes a loss function relevant to coreference resolution. For example, a stochastic gradient descent method may be utilized to learn the coreference embeddings. In some implementations the loss function may be indicative of a number of incorrect candidate antecedent noun phrases associated with a referring noun phrase.

At step 650, for a given noun phrase, distance measures between the given noun phrase and one or more candidate antecedent noun phrases may be determined based on the coreference embeddings. The distance measures are indicative of proximity of co-referential noun phrases. For example, an inner product of the embedded referring feature representations and the antecedent feature representations may be utilized to determine the distance measures. In some implementations a score may be associated with each pair of a candidate antecedent noun phrase and the given noun phrase. The score may be based on the determined distance measures.

In some implementations the ranking system 150 may rank the one or more candidate antecedent noun phrases associated with the given noun phrase. The ranking may be based on the score for the pair comprising of the candidate antecedent noun phrase and the given noun phrase. An antecedent noun phrase of the one or more candidate antecedent noun phrases may be selected based on the ranking. As described herein, for each of the one or more noun phrases in a document, candidate antecedents may be identified and ranked. In some implementations candidate antecedents associated with the given noun phrase may be grouped based on the ranking and/or scoring. In some implementations the highest ranked candidate antecedent in each group may be selected as the antecedent noun phrase associated with the given noun phrase.

Figure 7:
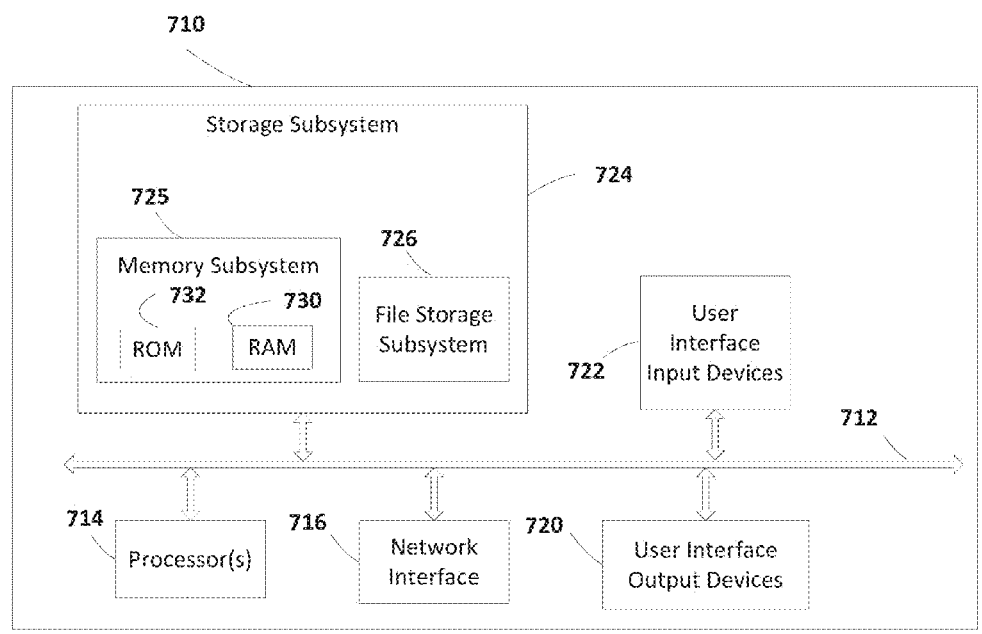
FIG. 7 illustrates a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to identify referring and antecedent feature representations of one or more noun phrases. As another example, the storage subsystem 724 may include the logic to determine groups of co-referential noun phrases based a scoring.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method useful for modifying a search query issued by a client device, comprising:
  identifying, by one or more computer systems, distributed word representations for a plurality of noun phrases, the distributed word representations indicative of syntactic and semantic features of the noun phrases;
  determining, by one or more of the computer systems for each of one or more of the noun phrases and based on labeled data, at least one training pair of a referring feature representation and an antecedent feature representation, wherein:
    the referring feature representation for the at least one training pair for a given noun phrase of the one or more noun phrases includes the distributed word representation for the given noun phrase, and
    the antecedent feature representation for the at least one training pair for the given noun phrase includes the distributed word representation for the given noun phrase augmented by one or more antecedent features, wherein the one or more antecedent features include a parse tree distance for the given noun phrase as a candidate antecedent noun phrase in the labeled data, the parse tree distance being a parse tree based distance between the given noun phrase as the candidate antecedent noun phrase and a corresponding referring noun phrase;

wherein the referring feature representations are m-dimensional space vectors, the antecedent feature representations are n-dimensional space vectors, and wherein the m-dimensional space vectors vary in length from the n-dimensional space vectors;

learning, by one or more of the computer systems, coreference embeddings of the referring and antecedent feature representations of the noun phrases, the learning comprising iteratively embedding the m-dimensional space vectors and the n-dimensional space vectors into a common k-dimensional space;

identifying, by one or more of the computer systems after the learning of the coreference embeddings, a first text segment and a second text segment associated with the first text segment, wherein the second text segment is a search query issued by a client device of a user;

identifying, by one or more of the computer systems in the first text segment, an occurrence of one or more candidate antecedent noun phrases;

identifying, by one or more of the computer systems in the second text segment, an occurrence of the given noun phrase;

determining, by one or more of the computer systems for the given noun phrase, distance measures, in the common k-dimensional space, between the given noun phrase and the one or more candidate antecedent noun phrases based on inner products of the coreference embeddings in the common k-dimensional space;

determining, by one or more of the computer systems, for a candidate noun phrase of the candidate antecedent noun phrases, a score for the candidate noun phrase as an antecedent for the given noun phrase based on the distance measure between the given noun phrase and the candidate noun phrase;

selecting, by one or more of the computer systems, the candidate noun phrase as the antecedent for the given noun phrase based on the determined score;

modifying, by one or more of the computer systems, the search query issued by the client device, wherein modifying the search query comprises replacing the given noun phrase with the selected candidate noun phrase in response to selecting the candidate noun phrase as the antecedent for the given noun phrase; and providing, by one or more of the computer systems in response to the search query issued by the client device, search results that are responsive to the modified query that replaces the given noun phrase with the selected candidate noun phrase.

2. The method of claim 1, wherein the one or more antecedent features further include one or more additional features indicative of one or more of a type of entity, a type of mention, number of words in the noun phrase, and a gender associated with the noun phrase.

3. The method of claim 1, wherein the referring feature representation is augmented with at least one referring feature, wherein the at least one referring feature is indicative of semantic features of the given noun phrase as a referring noun phrase.

4. The method of claim 3, wherein the referring feature is indicative of one or more of a type of entity, a type of mention, number of words in the noun phrase, and a gender associated with the noun phrase.

5. The method of claim 1, wherein the antecedent feature representation for the given noun phrase includes the referring feature representation for the given noun phrase augmented by the one or more antecedent features.

6. The method of claim 1, wherein identifying the distributed word representations for each of one or more noun phrases further includes:
identifying a language for the one or more noun phrases; and
determining the distributed word representations based on the language.

7. The method of claim 1, wherein learning the coreference embeddings is based on optimizing a loss function, the loss function indicative of a number of incorrect candidate antecedent noun phrases for the given noun phrase.

8. The method of claim 1, wherein the first text segment is a prior search query issued by the client device of the user prior to the search query.

9. A system useful for modifying a search query issued by a client device, the system including memory and one or more processors operable to execute instructions stored in the memory, comprising instructions to:
identify distributed word representations for one or more noun phrases, the distributed word representations indicative of syntactic and semantic features of the one or more noun phrases;
determine, for each of the one or more noun phrases and based on labeled data, at least one training pair of a referring feature representation and an antecedent feature representation, wherein:
the referring feature representation for the at least one training pair for a given noun phrase of the one or more noun phrases includes the distributed word representation for the given noun phrase, and
the antecedent feature representation for the at least one training pair for the given noun phrase includes the distributed word representation for the given noun phrase augmented by one or more antecedent features, wherein the one or more antecedent features include a parse tree distance for the given noun phrase as a candidate antecedent noun phrase in the labeled data, the parse tree distance being a parse tree based distance between the given noun phrase as the candidate antecedent noun phrase and a corresponding referring noun phrase;
wherein the referring feature representations are m-dimensional space vectors, the antecedent feature representations are n-dimensional space vectors, and wherein the m-dimensional space vectors vary in length from the n-dimensional space vectors;
learn coreference embeddings of the referring and antecedent feature representations of the one or more noun phrases based on iteratively embedding the m-dimensional space vectors and the n-dimensional space vectors into a common k-dimensional space;
identify, after the learning of the coreference embeddings, a first text segment and a second text segment associated with the first text segment, wherein the second text segment is a search query issued by a client device of a user;
identify, in the first text segment, an occurrence of one or more candidate antecedent noun phrases;
identify, in the second text segment, an occurrence of the given noun phrase;
determine, for the given noun phrase, distance measures, in the common k-dimensional space, between the given noun phrase and the one or more candidate antecedent noun phrases based on inner products of the coreference embeddings in the common k-dimensional space;

determine, for a candidate noun phrase of the candidate antecedent noun phrases, a score for the candidate noun phrase as an antecedent for the given noun phrase based on the distance measure between the given noun phrase and the candidate noun phrase;

select the candidate noun phrase as the antecedent for the given noun phrase based on the determined score;

modify the search query issued by the client device, wherein modifying the search query comprises replacing the given noun phrase with the selected candidate noun phrase in response to selecting the candidate noun phrase as the antecedent for the given noun phrase; and provide, in response to the search query issued by the client device, search results that are responsive to a modified query that replaces the given noun phrase with the selected candidate noun phrase.

10. The system of claim 9, wherein the one or more antecedent features further include one or more additional features indicative of one or more of a type of entity, a type of mention, number of words in the noun phrase, and a gender associated with the noun phrase.

11. The system of claim 9, wherein the referring feature representation is augmented with at least one referring feature, wherein the at least one referring feature is indicative of semantic features of the given noun phrase as a referring noun phrase.

12. The system of claim 11, wherein the referring feature is indicative of one or more of a type of entity, a type of mention, number of words in the noun phrase, and a gender associated with the noun phrase.

13. The system of claim 9, wherein the antecedent feature representation for the given noun phrase includes the referring feature representation for the given noun phrase augmented by the one or more antecedent features.

14. The system of claim 9, wherein the instructions to identify the distributed word representations for each of one or more noun phrases further include instructions to:
identify a language for the one or more noun phrases; and
determine the distributed word representations based on the language.

15. The system of claim 9, wherein the instructions to learn the coreference embeddings are based on instructions to optimize a loss function, the loss function indicative of a number of incorrect candidate antecedent noun phrases for the given noun phrase.

16. The system of claim 9, wherein the first text segment is a prior search query issued by the client device of the user prior to the search query.

17. A non-transitory computer readable storage medium storing computer instructions executable by a processor, including instructions that are useful for modifying a search query issued by a client device and that are to:
identify distributed word representations for one or more noun phrases, the distributed word representations indicative of syntactic and semantic features of the one or more noun phrases;
determine, for each of the one or more noun phrases and based on labeled data, at least one training pair of a referring feature representation and an antecedent feature representation, wherein:
the referring feature representation for the at least one training pair for a given noun phrase of the one or more noun phrases includes the distributed word representation for the given noun phrase, and
the antecedent feature representation for the at least one training pair for the given noun phrase includes the distributed word representation for the given noun phrase augmented by one or more antecedent features, wherein the one or more antecedent features include a parse tree distance for the given noun phrase as a candidate antecedent noun phrase in the labeled data, the parse tree distance being a parse tree based distance between the given noun phrase as the candidate antecedent noun phrase and a corresponding referring noun phrase;
wherein the referring feature representations are m-dimensional space vectors, the antecedent feature representations are n-dimensional space vectors, and wherein the m-dimensional space vectors vary in length from the n-dimensional space vectors;
learn coreference embeddings of the referring and antecedent feature representations of the one or more noun phrases based on iteratively embedding the m-dimensional space vectors and the n-dimensional space vectors into a common k-dimensional space;
identify, after the learning of the coreference embeddings, a first text segment and a second text segment associated with the first text segment, wherein the second text segment is a search query issued by a client device of a user;
identify, in the first text segment, an occurrence of one or more candidate antecedent noun phrases;
identify, in the second text segment, an occurrence of the given noun phrase;
determine, for the given noun phrase, distance measures, in the common k-dimensional space, between the given noun phrase and the one or more candidate antecedent noun phrases based on inner products of the coreference embeddings in the common k-dimensional space;
determine, for a candidate noun phrase of the candidate antecedent noun phrases, a score for the candidate noun phrase as an antecedent for the given noun phrase based on the distance measure between the given noun phrase and the candidate noun phrase;
select the candidate noun phrase as the antecedent for the given noun phrase based on the determined score;
modify the search query issued by the client device, wherein modifying the search query comprises replacing the given noun phrase with the selected candidate noun phrase in response to selecting the candidate noun phrase as the antecedent for the given noun phrase; and
provide, in response to the search query issued by the client device, search results that are responsive to a modified query that replaces the given noun phrase with the selected candidate noun phrase.

18. The non-transitory computer readable storage medium of claim 17, wherein the computer instructions further include instructions to:
identify a language for the one or more noun phrases; and
determine the distributed word representations based on the language.

* * * * *